March 20, 1951     F. M. KNAPIK     2,545,521
TOOL FOR CUTTING DENTURES
Filed June 26, 1945
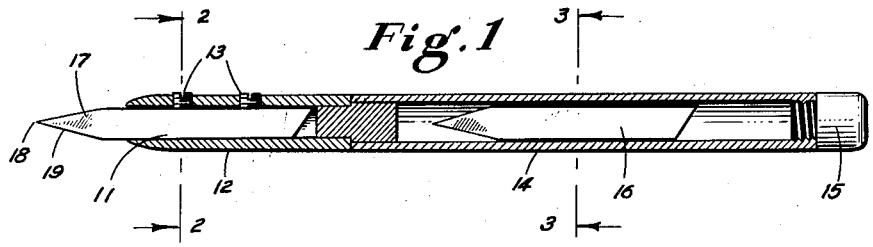
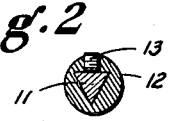
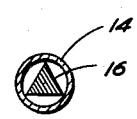
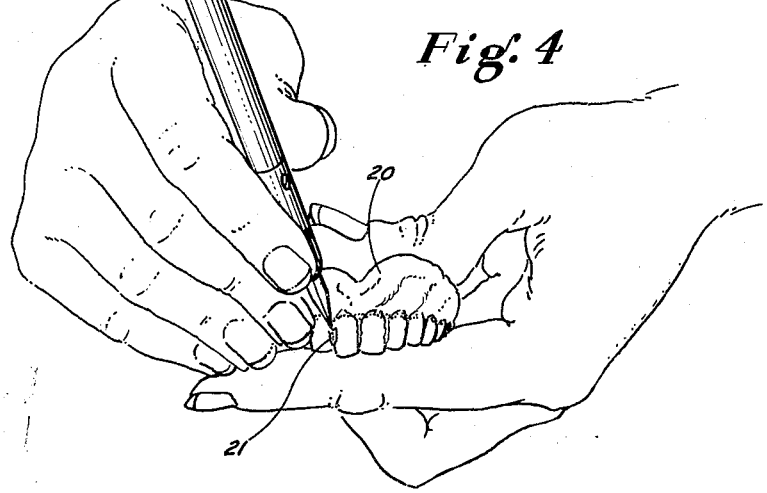
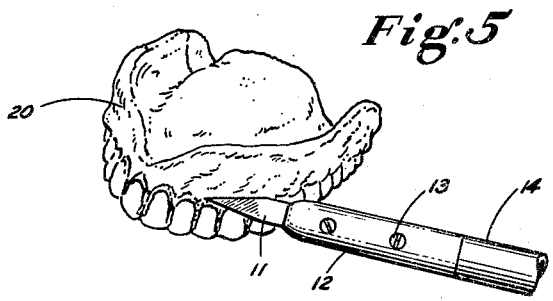
INVENTOR.
FRANK M. KNAPIK
BY
*Richey & Watts.*
ATTORNEYS Patented Mar. 20, 1951

2,545,521

UNITED STATES PATENT OFFICE 2,545,521

TOOL FOR CUTTING DENTURES

Frank M. Knapik, University Heights, Ohio, assignor of one-third to Ralph F. Knapik and one-third to Helen C. Knapik, University Heights, Ohio Application June 26, 1945, Serial No. 601,657

1 Claim. (Cl. 30—165)

This invention relates broadly to dental instruments and more particularly to hand tools for use in the finishing of dentures.

In the construction of false teeth the dentist first makes a wax impression of the portion of the patient's mouth to be supplied with a denture, then molds a so-called stone therefrom to form a model of the patient's mouth. Next, a wax bite plate of the general configuration of the denture is formed from the stone model and checked for conformation by insertion in the patient's mouth. Such bite plate is next mounted on an articulator together with the stone, the articulator being adapted to simulate the movement of the patient's jaws. The teeth for the denture are then selected and suitably positioned in the wax matrix of the bite plate after which the matrix is carved and finished with substantially the same care as a finished denture. Ultimately it is tested in the patient's mouth and reworked, where necessary, to obtain full engagement with the walls forming the oral cavity.

Next, the stone is secured to the wax matrix and the unit placed in a flask so that a fluent plaster may be poured therein and solidified to form a negative impression of the form of the desired denture. The plaster mold thus formed is separated from the original stone by use of a suitable parting material. By heating the mold obtained the wax forming the bite plate will melt and may be poured therefrom, but it will be seen that the teeth from the wax matrix are left embedded in the resultant plaster mold. The desired denture is then obtained by pressing any suitable plastic material, in plastic form, in and onto the plaster mold. After shaping the plastic and effecting the deposite thereof about the teeth embedded in the plaster mold, the entire assembly is processed to harden or set the plastic material. The stone or plaster mold is finally broken away to obtain the denture. Obviously, the denture requires appreciable cleaning and reworking to free the crevices and interstices therein from all excessive material overlying the surfaces of the teeth. The fine cracks, grooves, and the curvilineal recesses in the denture are usually partially filled or coated with the parting materal and/or excess plastic which must be carved away from the gingival and interproximal portions of the teeth and the other surfaces thereof.

The foregoing procedure is followed in the preparation of full or partial dentures and can also be used, in the general form outlined, in the production of clasps and various types of attachments for denture work.

One of the objects of this invention is to provide a novel denture tool adapted to expedite the production and cleaning of dentures.

Another object is to provide a tool arranged to clean simultaneously the adjacent surfaces defining a crack of line in a denture but which also may be conveniently handled to work over the other surfaces of the denture.

A further object is to provide a tool having the aforesaid advantages which utilizes easily sharpened, replaceable tool bits.

Referring to the drawings wherein is shown the preferred embodiment of the invention:

Fig. 1 is a longitudinal section of a denture tool embodying the present invention;

Figs. 2 and 3 are sectional views taken on lines 2—2 and 3—3 of Fig. 1 respectively;

Fig. 4 is a perspective view of a denture illustrating the use of the improved tool in the carving operation; and Fig. 5 is a perspective view of a denture indicating one of the positions in which the improved tool may be used for carving another surface.

Referring to Fig. 1, the denture tool comprises a cutter bar 11 which is triangular in cross section and preferably formed of tungsten carbide. The cutter bar is mounted in a cylindrical body 12 broached for the reception thereof and is secured therein by set screws 13. The body member 12 is affixed to a tubular handle 14 having an end cap 15 for the retention therein of auxiliary cutter bars 16. The cutter bar 11 is formed with a substantially pyramidal end portion 17 having an extremely sharp point 18 and hollow ground edges 19. The cutter bar 11 may be resharpened, when dulled by use, and the length and/or contour of the tapered end portion may, if desired, be slightly curved axially.

Fig. 4 of the drawing best shows the use of the denture tool. In this instance a denture 20 is being cleaned of excessive material and may either be held in the workman's hand as shown or held against a bench block (not shown). The cylindrical contour of the handle 14 held by the technician enables the cutter to be swung or rotated smoothly from the gingival portions of the teeth down into the interproximal portions or to the labial, lingual or buccal surfaces thereof, without a break in the sweep of the tool. The pyramidal shape of the cutter bar 11 enables the workman to clean simultaneously the adjacent surfaces of the portion of the denture being processed, such, for example, as the interproximal surfaces 21 as shown in Fig. 4.

The superfluous material adheres to the denture with great tenacity, and appreciable force is required to separate the film from the body of the denture. With the multi-edged cutter embodied in the present invention the excess material may be cut away without danger or scarring the teeth as frequently occurs where a single-edged tool is used. Backtracking and repeat strokes of the technician may be avoided since the denture tool can carve simultaneously both of two adjacent surfaces, and can readily be rolled from one tooth to another in a continuous movement. Fig. 4 illustrates the workman holding the denture firmly in one hand and the tool between the thumb and forefinger of the other hand. The tool, while so held, may be easily but positively moved over the surfaces of the denture in the trimming operation.

It will be seen that the denture cutter of the invention may also be used for shaping and trimming operations of the so called "try in" or model used by the dentist to check occlusion as well as dentures. The ready control and efficient cutting action afforded by the improved tool safeguards the operator from accidental injury and protects the teeth from damage due to excessive pressure in chip cutting operations.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

A denture tool comprising a cylindrical body member having a longitudinal opening of triangular cross section therethrough, a cutter bar of triangular cross section adapted to be secured in one end of said opening, said cutter bar having a pyramidal end section thereon providing a cutting point and three hollow ground cutting edges, and a cylindrical handle member secured to the opposed end of said body member to facilitate the rolling manipulation of the cutter bar over the surfaces of a denture, the body member and handle member being of substantially the same diameter and of considerably larger diameter than the cutter bar.

FRANK M. KNAPIK.

REFERENCES CITED

The following references are of record in the file of this patent:

UNITED STATES PATENTS

| Number | Name | Date |
|---|---|---|
| 237,093 | Crowell | Feb. 1, 1881 |
| 366,308 | Derby | July 12, 1887 |
| 436,891 | Deunerlohr | Sept. 23, 1890 |
| 764,946 | Hughes | July 12, 1904 |
| 1,220,933 | Bates | Mar. 27, 1917 |

FOREIGN PATENTS

| Number | Country | Date |
|---|---|---|
| 10,368 | Switzerland | May 4, 1895 |